US009800891B2

(12) United States Patent
Kalevo et al.

(10) Patent No.: US 9,800,891 B2
(45) Date of Patent: Oct. 24, 2017

(54) METHOD AND ASSOCIATED DEVICE FOR FILTERING DIGITAL VIDEO IMAGES

(75) Inventors: Ossi Kalevo, Toijala (FI); Emre Aksu, Tampere (FI); Marta Karczewicz, Irving, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 09/766,035

(22) Filed: Jan. 19, 2001

(65) Prior Publication Data

US 2001/0017944 A1    Aug. 30, 2001

(30) Foreign Application Priority Data

Jan. 20, 2000    (FI) ..................................... 20000120

(51) Int. Cl.
    *H04N 7/12*       (2006.01)
    *H04N 19/527*     (2014.01)
    *H04N 19/86*      (2014.01)

(52) U.S. Cl.
    CPC ........... *H04N 19/527* (2014.11); *H04N 19/86* (2014.11)

(58) Field of Classification Search
    CPC ....... H04N 19/0003; H04N 19/82; H04N 7/12
    USPC ............ 375/240.24–240.27, 240.29, 240.01, 375/240.08; 348/425.1–425.2, 420.1, 348/241, 245–246, 252, 533, 606–608, 348/620, 625, 627–630; 382/254–275
    See application file for complete search history.

(56) References Cited

U.S. PATENT DOCUMENTS

| | | | | |
|---|---|---|---|---|
| 5,218,649 A * | 6/1993 | Kundu et al. | ................. | 382/180 |
| 5,225,904 A * | 7/1993 | Golin et al. | ............. | 375/240.12 |
| 5,768,438 A | 6/1998 | Etoh | | |
| 5,812,702 A * | 9/1998 | Kundu | .......................... | 382/260 |
| 5,896,176 A * | 4/1999 | Das et al. | ................. | 375/240.15 |
| 5,912,706 A * | 6/1999 | Kikuchi et al. | .......... | 375/240.13 |
| 6,181,802 B1 * | 1/2001 | Todd | ............................ | 382/100 |
| 6,240,135 B1 * | 5/2001 | Kim | ......................... | 375/240.01 |
| RE37,668 E * | 4/2002 | Etoh | ............................ | 382/251 |
| 6,608,865 B1 * | 8/2003 | Itoh | .......................... | 375/240.08 |

FOREIGN PATENT DOCUMENTS

| | | |
|---|---|---|
| DE | 196 04 050 A1 | 2/1997 |
| EP | 0859518 A1 | 8/1998 |
| EP | 0 881 837 A1 | 12/1998 |
| EP | 0884911 A1 | 12/1998 |
| EP | 0 961 229 A2 | 12/1999 |

(Continued)

OTHER PUBLICATIONS

Kim et al., "A Deblocking Filter with Two Separate Modes in Block-Based Video Coding", IEEE Transactions on Circuits and Systems for Video Technology, vol. 9, No. 1, pp. 156-160, Feb. 1999.*

(Continued)

*Primary Examiner* — Young Lee
(74) *Attorney, Agent, or Firm* — Alston & Bird LLP (57) ABSTRACT

A method for reducing visual artifacts in a frame of a digital video signal, which is coded by blocks and then decoded, includes defining a block type is according to the coding method for a block selected according to a predetermined set of coding types. In the method filtering is performed to reduce visual artifacts due to a block boundary The filtering performed depends on block types of the frame in the environment of the block boundary.

41 Claims, 6 Drawing Sheets

(56) References Cited

FOREIGN PATENT DOCUMENTS

| | | |
|---|---|---|
| GB | 2 329 090 A | 3/1999 |
| GB | 2329090 | 10/1999 |
| RU | 2042282 C1 | 8/1995 |
| WO | WO 98/41025 | 9/1998 |
| WO | WO 00/49809 | 8/2000 |

OTHER PUBLICATIONS

Australian Search Report and Written Opinion for Application SG 200405663-6 mailed Feb. 2, 2006.
Office Action for European Application No. EP 01 902 442.1 dated Apr. 14, 2009.
International Search Report for Application No. PCT/FI01/00049 datd Apr. 17, 2001.
Decision on Grant for RU 2042282, Nov. 20, 2008, please see p. 15.

\* cited by examiner

METHOD AND ASSOCIATED DEVICE FOR FILTERING DIGITAL VIDEO IMAGES

BACKGROUND OF THE INVENTION

1. Field of the Invention

The present invention relates to a method for reducing visual artefacts in a frame of a digital video signal, which is coded by blocks and then decoded, a block type being defined according to the coding method for a block selected from a predetermined set of coding types, in which filtering is performed to reduce visual artefacts due to a block boundary. The present invention also relates to a device for reducing visual artefacts in a frame of a digital video signal, which is coded by blocks and then decoded, a block type being defined according to the coding method for a block selected according to a predetermined set of coding types, the device comprising a filter for reducing visual artefacts due to a block boundary. Furthermore, the present invention relates to a video encoder comprising means for coding and decoding a digital video signal by blocks, a block type being defined according to the coding method for a block selected according to a predetermined set of coding types, which encoder comprises a filter for reducing visual artefacts due to a block boundary. The present invention also relates to a video decoder comprising means for reducing visual artefacts in a frame of a digital video signal, which is coded by blocks and then decoded, a block type being defined according to the coding method for a block selected according to a predetermined set of coding types, which video decoder comprises a filter for reducing visual artefacts due to a block boundary. The present invention also relates to a video codec comprising means for coding and decoding a digital video signal by blocks, a block type being defined according to the coding method for a block selected according to a predetermined set of coding types, which video codec comprises a filter for reducing visual artefacts due to a block boundary. The present invention also relates to a mobile terminal comprising a video codec, which comprises means for coding and decoding a digital video signal by blocks, a block type being defined according to the coding method for a block selected according to a predetermined set of coding types, which video codec comprises a filter for reducing visual artefacts due to a block boundary. The present invention further relates to a storage medium for storing a software program comprising machine executable steps for coding and decoding a digital video signal by blocks, a block type being defined according to the coding method for a block selected according to a predetermined set of coding types, for reducing visual artefacts due to a block boundary by filtering.

2. Brief Description of Related Developments

Figure 1:
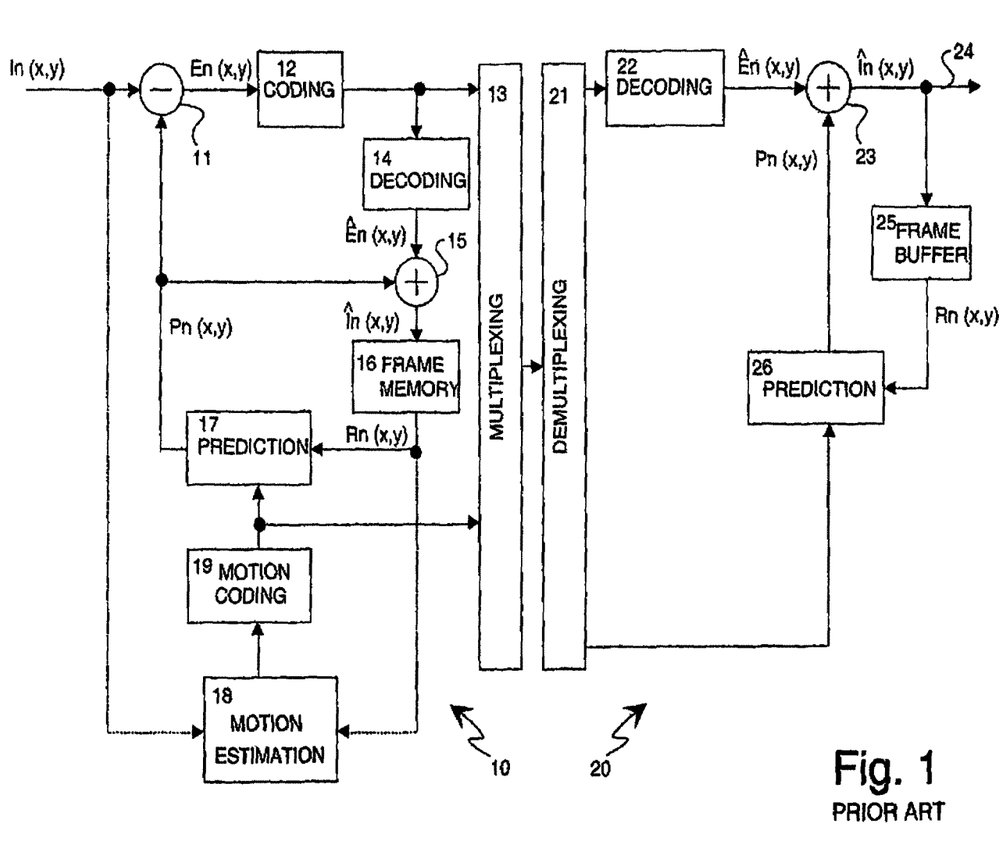
FIG. 1 represents a a digital video encoding and decoding system (codec) according to prior art.

A transmission system like that shown in FIG. 1 is generally used for transferring a digital video image in compressed form. The video image is formed of sequential frames. In some prior art video transmission systems, for example those according to the ITU-T H.261/H.263 recommendations, at least three frame types are defined: an I-frame (Intra), a P-frame (Predicted or Inter), and a B-frame (Bi-directional). The I-frame is generated solely on the basis of information contained in the image itself, wherein at the receiving end, this I-frame can be used to form the entire image. P-frames are formed on the basis of a preceding I-frame or P-frame, wherein at the receiving stage a preceding I-frame or P-frame is correspondingly used together with the received P-frame in order to reconstruct the image. In the composition of P-frames, for instance, motion compensation is used to compress the quantity of information. B-frames are formed on the basis of one or more preceding P-frames or I-frames and/or one or more following P- or I-frames.

The frames are further divided into blocks. One or more such blocks forms a block region. There can generally be four different region types: Intra region, copy region, coded region, and not-coded region. An intra region is a block region in which the blocks are coded independently without reference to any other frame. A copy region consists of blocks which are obtained by copying the content of the reference frame into exactly the same location without any motion compensated prediction. A coded region consists of blocks which are obtained using motion compensated prediction and prediction error coding. The prediction error is a difference between the pixel values of the actual frame and a reconstructed frame which is formed in the coding/decoding system using motion compensated prediction, as will be described in further detail later in the text. The prediction error is coded and sent to a receiver. A not-coded region is obtained using motion compensated prediction only. In fact the not-coded region is equivalent to a copy region if the motion information equals 0. All the block regions of one frame are not necessarily similar types, but one frame can comprise block regions which are of different types.

Referring to FIG. 1, which illustrates a typical encoding and decoding system (codec) used, for example, in the transmission of digital video, a current video frame to be coded comes to the transmission system 10 as input data $I_n(x,y)$. The input data $I_n(x,y)$ typically takes the form of pixel value information. In the differential summer 11 it is transformed into a prediction error frame $E_n(x,y)$ by subtracting from it a prediction frame $P_n(x,y)$ formed on the basis of a previous image. The prediction error frame is coded in block 12 in a manner described hereinafter, and the coded prediction error frame is directed to a multiplexer 13. To form a new prediction frame, the coded prediction error frame is also directed to a decoder 14, which produces a decoded prediction error frame $\hat{E}_n(x,y)$ which is summed in a summer 15 with the prediction frame $P_n(x,y)$, resulting in a decoded frame $\hat{I}_n(x,y)$. The decoded frame is saved in a frame memory 16. To code the next frame, the frame saved in the frame memory 16 is read as a reference frame $R_n(x,y)$ and is transformed into a new prediction frame $P_n(x,y)$ in a motion compensation and prediction block 17, according to the formula:

$$P_n(x,y)=R_n[x+Dx(x,y),y+Dy(x,y)] \qquad (1)$$

The pair of numbers [Dx(x,y), Dy(x,y)] is called the motion vector of the pixel at location (x,y) and the numbers Dx(x,y) and Dy(x,y) are the horizontal and vertical shifts of the pixel. They are calculated in a motion estimation block 18. The set of motion vectors [Dx(•), Dy(•)] consisting of all motion vectors related to the pixels of the frame to be compressed is also coded using a motion model comprising basis functions and coefficients. The basis functions are known to both the encoder and the decoder. The coefficient values are coded and directed to the multiplexer 13, which multiplexes them into the same data stream with the coded prediction error frame for sending to a receiver. In this way the amount of information to be transmitted is dramatically reduced.

Some frames can be partly, or entirely, so difficult to predict that it is not practical to use motion compensated prediction when coding them. These frames or parts of frames are coded using intra-coding without prediction, and therefore it is not necessary to send motion vector information relating to them to the receiver.

In the receiver system 20, a demultiplexer 21 separates the coded prediction error frames and the motion information transmitted by the motion vectors and directs the coded prediction error frames to a decoder 22. The decoder 22 produces a decoded prediction error frame $\hat{E}_n(x,y)$, which is summed in a summer 23 with the prediction frame $P_n(x,y)$ formed on the basis of a previous frame, resulting in a decoded frame $\hat{I}_n(x,y)$. The decoded frame is directed to an output 24 of the decoder and at the same time saved in a frame memory 25. When decoding the next frame, the frame saved in the frame memory is read as a reference frame and transformed into a new prediction frame in the motion compensation and prediction block 26, according to formula (1) presented above.

The coding method applied in block 12 to the coding of the prediction error frame or to the intra-coding of a frame or part of a P-frame to be sent without prediction, is generally based on a transformation, the most common of which is the Discrete Cosine Transformation, DCT. The frame is divided into adjacent blocks having a size of e.g. 8×8 pixels. In coding and decoding, the blocks are processed independent of one another. The transformation is calculated for the block to be coded, resulting in a series of terms. The coefficients of these terms are quantized on a discrete scale in order that they can be processed digitally. Quantization causes rounding errors, which can become visible in an image reconstructed from blocks, so that there is a discontinuity of pixel values at the boundary between two adjacent blocks. Because a certain decoded frame is used for calculating the prediction frame for subsequent predicted frames, these errors can be propagated in sequential frames, thus causing visible edges in the image reproduced by the receiver. Image errors of this type are called blocking artefacts.

Some prior art methods are known for removing blocking artefacts. These methods are characterized by the following features:
- determining which pixel/pixels require value correction in order to remove the blocking artefact,
- determining a suitable low-pass filtering for each pixel to be corrected, based on the values of other pixels contained by a filtering window placed around the pixel,
- calculating a new value for the pixel to be corrected, and rounding the new value to the closest digitized pixel value.

Factors that influence the selection of a filter and the decision whether to use filtering can be, for example, the difference between the values of pixels across the block boundary, the size of the quantization step of the coefficients received as the transformation result, and the difference of the pixel values on different sides of the pixel being processed.

It has been found that prior art methods tend to remove lines that belong to real features of the image. On the other hand, prior art methods are not always capable of removing all blocking artefacts.

SUMMARY OF THE INVENTION

An objective of the present invention is to present a new kind of filtering arrangement for reducing blocking artefacts. The invention also has the objective that the method and associated device operate more reliably and efficiently than prior art solutions.

The method according to the invention adjusts filtering parameters according to the type of blocks whose boundary is to be filtered. Different filtering parameters are chosen according to the type of block on either side of the boundary in order to yield an improved filtering result.

The objectives of the invention are achieved by adapting the selection of pixels for filtering and the filtering process more flexibly than before to the features of the frame and the environment of the filtering point and by taking into account the nature/type of the blocks to be filtered.

According to a first aspect of the invention, there is provided a method for reducing visual artefacts in a frame that is coded by blocks, characterized in that the filtering performed on the block boundary depends on block types of the frame in the environment of the block boundary.

According to a second aspect of the invention, there is provided a device for implementing the method according to the invention. The device according to the invention is characterized in that the filter is arranged to operate adaptively according to the block types of the frame in the environment of the block boundary.

According to a third aspect of the invention, there is provided an encoder characterized in that the filter is arranged to operate adaptively according to the block types of the frame in the environment of the block boundary.

According to a fourth aspect of the invention, there is provided a decoder characterized in that the filter is arranged to operate adaptively according to the block types of the frame in the environment of the block boundary.

According to a fifth aspect of the invention, there is provided a codec characterized in that the filter is arranged to operate adaptively according to the the block types of the frame in the environment of the block boundary.

According to a sixth aspect of the invention, there is provided a mobile terminal characterized in that the filter is arranged to operate adaptively according to the the block types of the frame in the environment of the block boundary.

According to a seventh aspect of the invention, there is provided a storage medium characterized in that the software program further comprises machine executable steps for filtering adaptively according to the the block types of the frame in the environment of the block boundary.

Because blocking artefacts only occur at block boundaries, according to the invention, filtering is advantageously only applied to pixels at block boundaries and the vicinity thereof. Edges that are part of the image can reside anywhere in the image area. In order that only pixels containing blocking artefacts are selected for corrective filtering and that the quality of edges that are part of the image itself is not affected during filtering, the following assumptions are made:

Changes in pixel values associated with edges that are part of the image are generally larger than those associated with blocking artefacts, and those edges within the image, where the pixel value change is small, do not suffer considerably from the rounding of the pixel value difference caused by filtering.

Because the image to be coded is generally divided into blocks both vertically and horizontally, the image contains both vertical and horizontal block boundaries. With regard to vertical block boundaries, there are pixels to the right and left of the boundary, and with regard to horizontal block boundaries, there are pixels above and below the boundary. In general, the location of the pixels can be described as being on a first or a second side of the block boundary. In an exemplary embodiment of the filtering method according to the invention, the number of pixels to be corrected, the characteristic features of the filter being used and the size of the filtering window depend on the following factors:

a) The type of block on either side of the boundary (e.g. inter, copy, coded, not-coded),
b) the difference in pixel values $\Delta$ across the block boundary. The difference can be defined in many ways. One definition is $\Delta = |r_1 - l_1|$, where $r_1$ is the value of the pixel on the first side of the block boundary closest to the boundary, and $l_1$ is the value of the pixel on the second side of the block boundary closest to the boundary,
c) the size of the quantization step OP of the coefficients received as the result of the transformation used in coding, and
d) differences in pixel values between the pixels on the first side of the block boundary, and correspondingly between the pixels on the second side of the block boundary.

In an advantageous embodiment of the method according to the invention, the number of the pixels selected for filtering can vary, and it is not necessarily the same on different sides of a block boundary. The number of pixels also depends on the type of block on either side of the boundary. Because the number of pixels is adapted to the general features of the image information contained by the frame in a particular region according to the factors mentioned above, the method produces a better filtering result than that provided by prior art methods. A "better" result in this context is one in which blocking artefacts are reduced to a greater extent while real edges in the image are affected to a lesser degree. This means that a larger amount of blocking artefacts can be removed without weakening the real image edges unreasonably.

It should be noted that in other embodiments of the invention, the factors affecting the filtering performed at a block boundary may differ from those presented above.

BRIEF DESCRIPTION OF THE DRAWINGS

In the following, the invention will be described in more detail with reference to the preferred embodiments and the accompanying drawings, in which.

DETAILED DESCRIPTION OF THE PREFERRED EMBODIMENT(S)

In the above, in connection with the description of the prior art, reference was made to FIG. 1. In the following description of the invention and its preferred embodiments, reference will be made mostly to FIGS. 2 to 5. The same reference numbers are used for corresponding parts in the figures.

Figure 2:
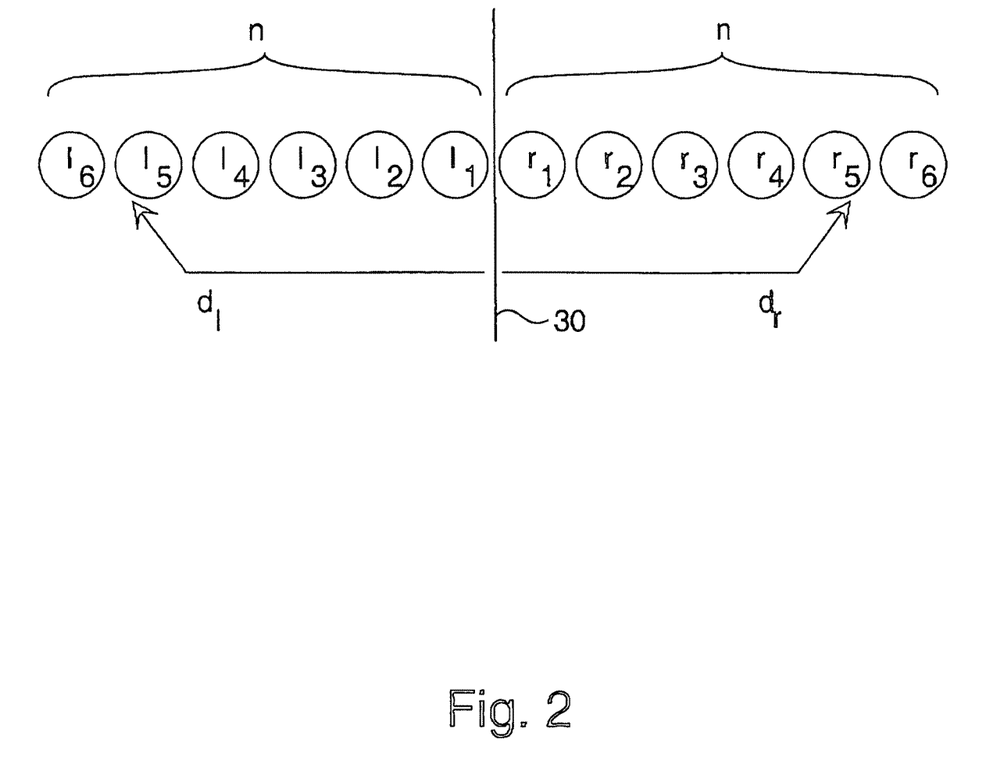
FIG. 2 represents the location of pixels in relation to a block boundary in an exemplary embodiment of the method according to the invention.

FIG. 2 shows the location of the pixels $r_1$-$r_6$ and $l_1$-$l_6$ in relation to a vertical block boundary 30. To implement the method according to the invention, certain parameters are specified. Parameter n is the largest number of pixels to be examined from the block boundary in one direction, and in the case of FIG. 2 its value is 6. It is advantageous to select the value of the parameter n so that it has a certain relation to both the difference of the pixel values $\Delta$ across the block boundary and to the size of the quantization step QP of the coefficients received as the result of image coding. Furthermore, the value of parameter n is advantageously smaller than or equal to the number of pixels in the block in the direction of examination, to avoid possible blocking artefacts associated with previous block boundaries spreading to the block boundary under examination. The following definition is recommended for use in a preferred embodiment of the invention applied to image blocks comprising 8×8 pixels:

$$n = \begin{cases} 0 & \Delta \geq 2.00\alpha \\ 1 & 1.50\alpha \leq \Delta < 2.00\alpha \\ 2 & 1.00\alpha \leq \Delta < 1.50\alpha \\ 3 & 0.66\alpha \leq \Delta < 1.00\alpha, \\ 4 & 0.40\alpha \leq \Delta < 0.66\alpha \\ 5 & 0.25\alpha \leq \Delta < 0.40\alpha \\ 6 & 0 \leq \Delta < 0.25\alpha \end{cases} \quad (2)$$

wherein $\alpha = QP \cdot \log(QP)$. If QP has a different value in blocks on different sides of the block boundary, the smaller value of QP is used in the calculations, as well as in all cases presented hereinafter, in which a definition includes reference to one OP value only. The invention does not place any limitations on the determination of the value of parameter n, but according to the guidelines of equation (2), it is advantageous that its value is generally higher when the difference of pixel values $\Delta$ across the block boundary is small in comparison with the size of the quantization step OP of the coefficients received as the result of the coding transformation. If the difference between the pixel values $\Delta$ is large, there is a high probability that there is a real image edge at the block boundary, and in this case the pixels are preferably not examined for filtering at all (n=0).

In the next step of the filtering method according to the invention, region type information concerning the two neighbouring blocks is examined, i.e. the type of the blocks on both sides of the block boundary in question is considered. According to the region type information, the value of the parameter n may further be limited (truncated) to provide even better results for reducing blocking artefacts. The region type information is included e.g. in the coded information relating to the pixels of a particular block, wherein that information is maintained, or temporarily stored, during decoding of the block until a truncated value $n_{tr}$ for parameter n is determined.

Table 1 shows truncation values according to an advantageous embodiment of the present invention. Table 1 applies in a situation where the maximum value of n is 6, and, of course, different truncated values would be appropriate in situations where the maximum value is other than 6. The truncation values are used for the first and second sides of the block boundary depending on the region type of the block on the first side of the block boundary and on the region type of the block on the second side of the block boundary.

TABLE 1

| type of the Block on the First side of a boundary | type of the Block on the Second side of a boundary | | | | | | | |
|---|---|---|---|---|---|---|---|---|
| | INTRA | | COPY | | CODED | | NOT_CODED | |
| INTRA | n | n | 2 | 2 | n | 4 | n | 2 |
| COPY | 2 | 2 | 2 | 2 | 2 | 4 | 2 | 2 |
| CODED | 4 | n | 4 | 2 | 4 | 4 | 4 | 2 |
| NOT_CODED | 2 | n | 2 | 2 | 2 | 4 | 2 | 2 |

Each cell of Table 1, corresponding to a particular region type combination, is split into two parts. The value on the left gives the truncation value trval for the first side of the block boundary and the value on the right gives the truncation value trval for the second side of the boundary. If the value of parameter n exceeds the value given in Table 1, n is truncated to the truncation value trval in Table 1. If, however, the value of the overall activity parameter n does not exceed the value given in Table 1, the value of the parameter n (originally determined from equation (2)) is retained. In Table 1 the symbol "n" indicates that further truncation is not performed and the parameter value is retained. The truncated value $n_{tr}$ for the parameter n can also be represented by the formula:

$$n_{tr} = \min(trval, n), \quad (3)$$

The same table can be used both for filtering across vertical block boundaries (horizontal filtering) by putting "Left"/"Right" in place of "First"/"Second" and for filtering across horizontal block boundaries (vertical filtering) by putting "Bottom"/"Up" in place of "First"/"Second", respectively. Now, the value on the left gives the truncation value for the pixels on the left/below the block boundary, and the value on the right gives the truncation value for the pixels on the right/above the boundary.

To further clarify the use of Table 1, an example situation is presented in the following. In this illustrative example situation "horizontal filtering" is performed across a vertical block boundary 30. Assuming that the value for parameter n, calculated from equation 2, is e.g. 4, the block on the left-hand side of the block boundary 30 in question is of the Intra type, and the block on the right-hand side of the block boundary 30 in question is of the Not-coded type, Table 1 indicates that the truncation value for the left-hand side is n and the truncation value for the right-hand side is 2. This means that the 4 pixels closest to the block boundary (=the calculated value of n) are selected for examination from the left-hand side of the boundary, and 2 pixels closest to the block boundary (=the truncated value of n) are selected for examination from the right-hand side.

Another example situation is presented in the following. In this illustrative example situation "horizontal filtering" is performed across a vertical block boundary 30. Assuming that the value of parameter n calculated from equation (2) is e.g. 4, and the blocks on both sides of the block boundary 30 in question are of the Copy type, Table 1 indicates that the truncation value for the left-hand side is 2 and the truncation value for the right-hand side is 2. This means that the 2 pixels closest to the block boundary (=the truncated value of n) are selected for examination from the left-hand side of the boundary, and the 2 pixels closest to the block boundary (=the truncated value of n) are selected for examination from the right-hand side.

For bi-directionally predicted frames (B-frames), truncation of the parameter n is advantageously not applied because there is no unique block type information.

The next step in the filtering method according to the invention is to determine the values of the parameters $d_r$ and $d_l$, which represent activity, or the differences of pixel values between pixels on one side of the block boundary. A preferred definition for $d_r$ is the following:

$d_r = 6$, if $|r_1 - r_j| \leq \beta/j$ with all $j \in [1,6]$, otherwise: $d_r = i$, where i fulfils the conditions $i \in [1, n_{tr}]$, $|r_1 - r_{i+1}| > \beta/i$ and $|r_1 - r_j| \leq \beta/j$ with all $j \in [1,i]$. (4)

Here, the auxiliary parameter $\beta = 4 \cdot \log(QP)$. The value of parameter $d_l$ is determined similarly, except that all r's are replaced by l's and the corresponding truncated value $n_{tr}$ for the parameter n must be used. The number 6 appears in definition (4) because, according to equation (2), the highest possible value of n is 6 in this case. If n is defined differently, but the parameters $d_r$ and $d_l$ are defined according to definition (4), the number 6 must be replaced by the highest possible value of n according to the new definition.

It is advantageous that the values of the parameters $d_r$ and $d_l$ are calculated independent of one another, because the image information contained by the frame can be different on different sides of the block boundary. The invention does not limit the definition of parameters $d_r$ and $d_l$, but according to the guidelines of definition (4), it is advantageous that these parameters are used to limit the blocking artefact processing relatively close to the block boundary, if there is a real image edge near the block boundary. The essential features of definition (4) can be summarised as follows: the value of parameter $d_r$ (and correspondingly the value of parameter $d_l$) provides an indication of how many pixels counted from the block boundary have approximately the same value as the pixel at the block boundary.

A high value of parameter n (e.g. 6) indicates that the difference between the pixel values at the block boundary is relatively small compared with the general variation of the pixel values within the block. In this case, it is possible that there is a real image edge near the block boundary. By selecting a sufficiently small value of parameter $d_r$ (or $d_l$), it is possible to restrict the filtering aimed at correcting blocking artefacts so that it does not have a deteriorating effect on a real image edge close to the block boundary. In some situations, a large number of pixels counted from the block boundary have approximately the same value as the pixel at the block boundary. In that case, definition (4) would give the parameter $d_r$ (or $d_l$) a relatively high value. However, if there is a clear discontinuity in pixel values between the blocks, the parameter n has a small value and the truncated value $n_{tr}$ is used in the definition (4) which make sure that an unreasonably high value is not selected as the value of the parameter $d_r$ (or $d_l$). Otherwise, a relatively high value of the parameter $d_r$ (or $d_l$) would result in unnecessary filtering.

If blocks on both sides of the block boundary are Intra-type blocks, the truncation has no effect on the selection of the parameter values n, $d_r$ and $d_l$. On the other hand, if at least one of the blocks has a type other than Intra, the truncation of the value n according to the formula (3) may limit the number of pixels filtered. This has the advantage that the block boundaries are not smoothed too much.

In addition, the largest possible number of pixels to be filtered must be decided. This does not have a notation of its own in FIG. 2, but it can be e.g. 3, which means that filtering can only be used to correct the value of the pixels $r_1$, $r_2$, $r_3$, $l_1$, $l_2$ and $l_3$.

When the values of the parameters n, $n_{tr}$, $d_r$ and $d_l$ have been determined, filtering is carried out using a suitable filter. The invention does not limit the kind of filter that can be used, but a filtering arrangement that has been found preferable, will be described in the following. Filtering is used to determine a new value for the pixels selected for filtering. In a preferred embodiment of the invention, a new pixel value is determined for a given pixel by calculating the mean of the pixel values that appear in a filtering window. In the preferred embodiment, the filtering window is symmetrical with regard to the pixel to be filtered and contains, in addition to the pixel to be filtered, one, two or three pixels from both sides, depending on the values of the parameters $d_r$ and $d_l$ as described hereinafter. Of course, these are only examples and other values could be chosen in situations where n, $n_{tr}$, $d_r$ and $d_l$ are defined differently. The calculated mean value is rounded to the closest digitized pixel value, whereby it becomes the new value of the filtered pixel.

Table 2 shows the determination of the width of the filtering window for the pixels $r_1$, $r_2$ and $r_3$ according to the value of parameter $d_r$ in a preferred embodiment of the invention. The values of the pixels $l_1$, $l_2$ and $l_3$ are determined in the same manner according to the value of the parameter $d_l$. In the table, "X" means that the pixel in question is not filtered at all, and the number means that the filtering window includes a number of pixels shown by the number from each side of the pixel being examined. Among other things, Table 2 shows that for filtering to be applied to any pixel, parameters $d_r$ and $d_l$ must both have a value greater than 1.

| $d_r$ ($d_l$ > 1) | $r_1$ | $r_2$ | $r_3$ |
|---|---|---|---|
| 1 | X | X | X |
| 2 | 1 | X | X |
| 3 | 1 | 1* | X |
| 4 | 2 | 2 | X |
| 5 | 2 | 2 | 2** |
| 6 | 3 or 2*** | 3 | 3 |

*the filtered value of pixel $r_1$ is used for filtering of pixel $r_2$
**the filtered values of pixels $r_1$ and $r_2$ are used for filtering pixel $r_3$
***3 if $d_l$ > 2, otherwise 2.

The above description relates to implementing the filtering on one horizontal part of a pixel row, which is 12 pixels long and located symmetrically on both sides of a vertical block boundary. The description can be easily generalized to concern vertical parts of pixel columns, which are located symmetrically on both sides of a horizontal block boundary: FIG. 2 can be turned 90 degrees counter-clockwise, whereby block boundary 30 becomes horizontal, and the pixels shown in the figure form part of the vertical pixel column so that pixels $r_1$-$r_6$ are the pixels above and pixels $l_1$-$l_6$ are the pixels below the boundary. To filter block boundaries throughout the whole frame, applying the method according to the invention, all vertical block boundaries of the frame are examined row by row and all horizontal block boundaries are examined column by column. The order has no significance as such, and thus all the horizontal block boundaries of the frame could be examined first column by column, and then all the vertical block boundaries row by row. In an advantageous embodiment of the invention, filtering is repeated line by line, i.e. the first line of the pixels in the blocks (besides the boundary) is filtered first, then the second line, etc.

Figure 3:
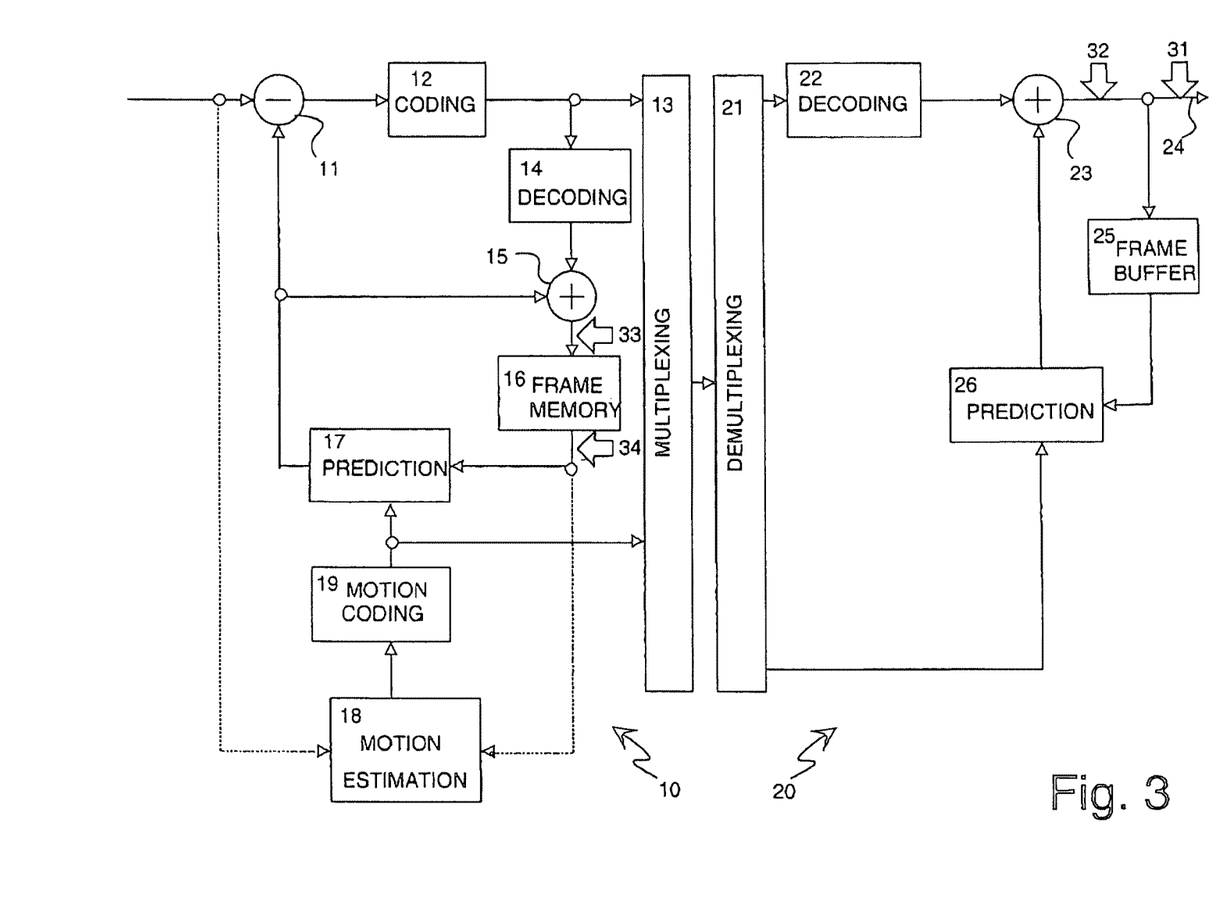
FIG. 3 represents alternatives for locating the filtering method according to the invention in a digital video encoding and decoding system.

FIG. 3 shows at which points a digital image encoding and decoding system (codec) according to prior art can be improved by applying filtering according to the invention. The first alternative is to place a block implementing the filtering method according to the invention in the output of the decoder of the receiver, as illustrated by reference number 31. In this case, block boundaries in the video frame are filtered after all blocks within the frame have been decoded. This requires block type information to be stored for all the blocks in one frame. Another alternative is to place the filtering block in the receiver before the point at which the decoded frame is directed to the frame memory 25 for forming a prediction frame, as illustrated by reference number 32. In this case, block type information for all blocks within the frame must also be stored, as block boundary filtering is still performed after decoding and reconstructing the entire frame. However, this alternative has the advantage that the removal of blocking artefacts also has an effect on the formation of a prediction frame, whereby blocking artefacts in one frame are not propagated via the prediction frame to subsequent frames. In order to achieve the effect just described, the block that performs filtering according to the invention can be placed either before or after the frame memory 25. However, the location shown by reference number 32 is preferred, because when applied at this stage, the filtering influences simultaneously the frame to be output by the receiving decoder and the frame to be saved in the memory. In the transmitter, a block implementing the filtering method according to the invention can be placed as shown by reference numbers 33 and 34, either before or after the frame memory 16. In this way, the invention can also be used to produce a corrected prediction frame at the transmission end.

Figure 4:
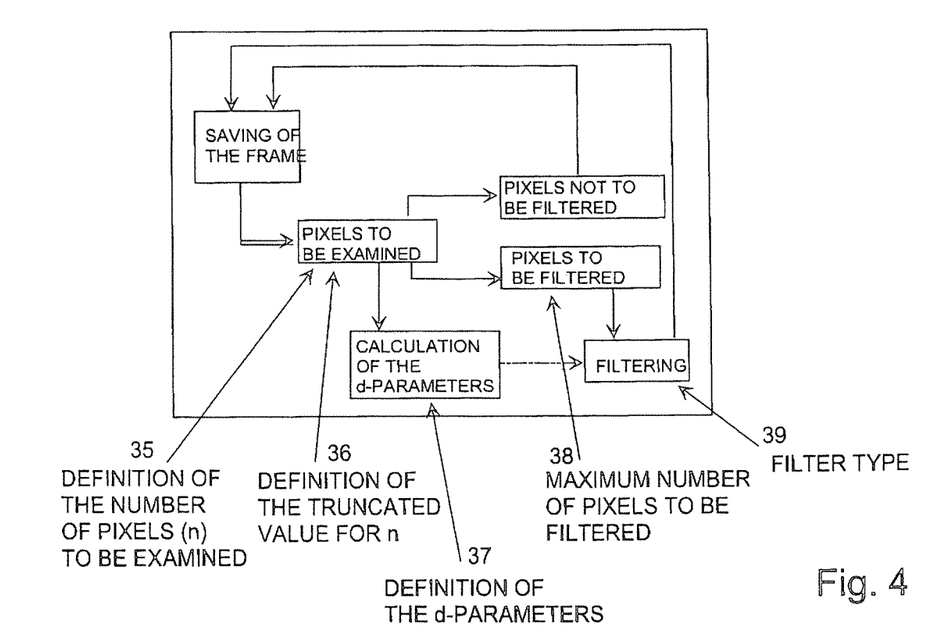
FIG. 4 is a schematic representation of a device for implementing a method according to the invention.
Figure 5:
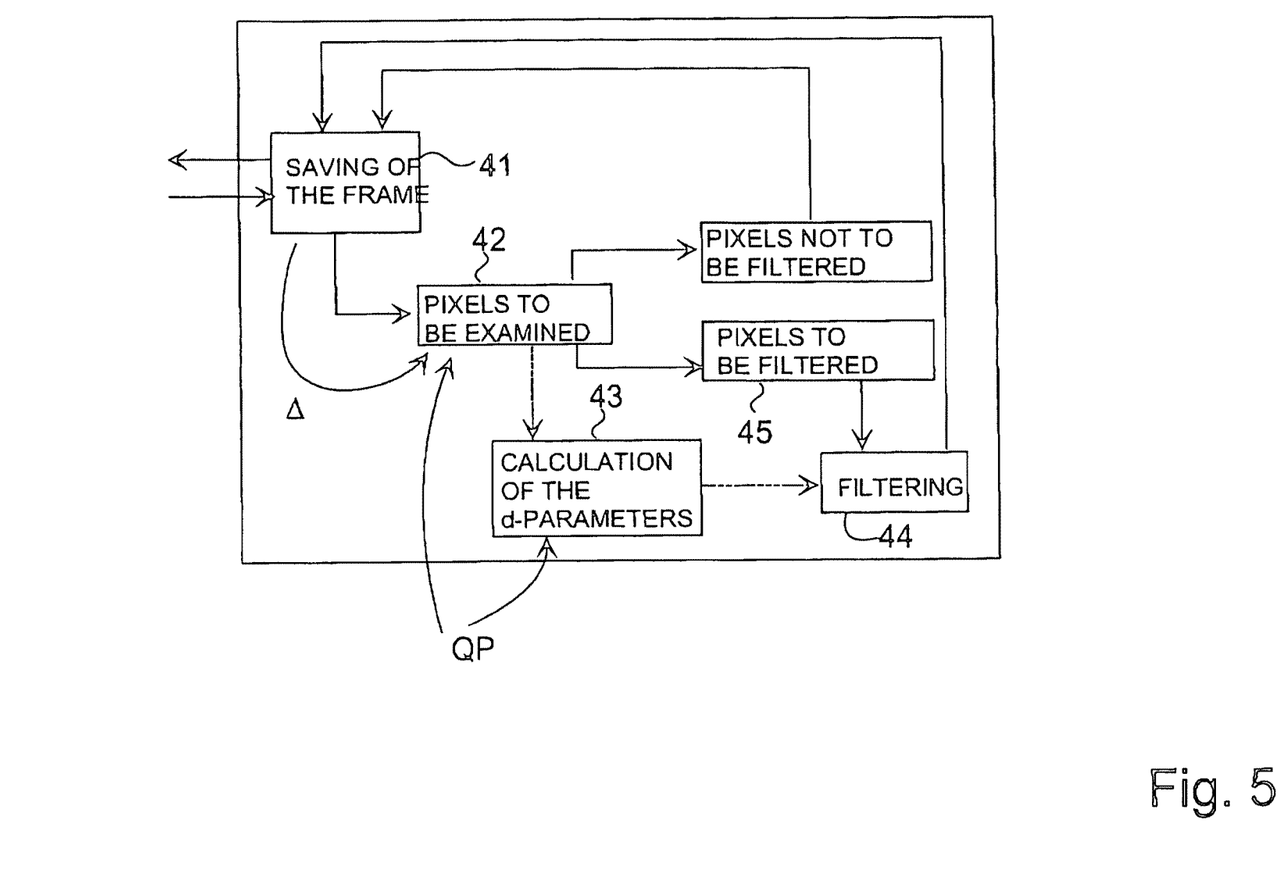
FIG. 5 represents a device according to FIG. 4 in operation.

In a particularly advantageous embodiment of the invention, the block carrying out the filtering according to the invention is implemented in a digital signal processor or a corresponding device suited for processing a digital signal, which can be programmed to apply predetermined processing functions to a signal received as input data. FIG. 4 presents the functional elements of a block carrying out the filtering method according to the invention, implemented as a digital signal processor. Correspondingly, operation of the filtering block is illustrated by FIG. 5. Referring first to FIG. 4, the functional elements are programmed with functional definitions (35-39) for calculating the parameters that control the filtering method according to the invention. Advantageously, the functional definitions are loaded into the signal processor in connection with its manufacture or programming. During operation according to FIG. 5, the frame is saved temporarily in register 41, so that it can be processed by the signal processor. Processing of the frame proceeds block-by-block. At a given instant, a number of pixels indicated by the parameter n, $n_{tr}$, according to the definitions provided in Table 1, are selected to be examined 42 from each side of a certain point on a certain block boundary, the d-parameters 43 are calculated, and filtering 44 is performed. These operations are repeated until all boundaries of all blocks have been filtered/processed, after which the frame can be output from register 41 and a new frame saved for processing. The measures according to FIGS. 4 and 5 can be carried out in a separate signal processor or they can be implemented in a general processor which also contains other arrangements for signal processing.

A storage medium can be used for storing a software program comprising machine executable steps for performing the method according to the invention. In an advantageous embodiment of the invention, the software program is read from the storage medium to a device comprising programmable means, e.g. a processor, for performing the method of the invention.

The invention can be modified without departing from the scope defined by the claims presented hereinafter, using the capabilities of a person skilled in the art without actual inventive steps. For example, the parameter $\Delta$ can be calculated using the formula $\Delta=|r_1+r_2)-(l_1+l_2)|$ or some other formula considered suitable. The definitions of the other parameters presented above should also be considered as examples only. A particularly advantageous use of the invention is in mobile video telecommunication applications, digital television receivers and other devices that at least receive and decode digital video image. It should further be noted that in general the method according to the invention may be applied to any image coding method in which an image is encoded/decoded on a block-by-block basis, including individual (i.e. still) digital images.

Figure 6:
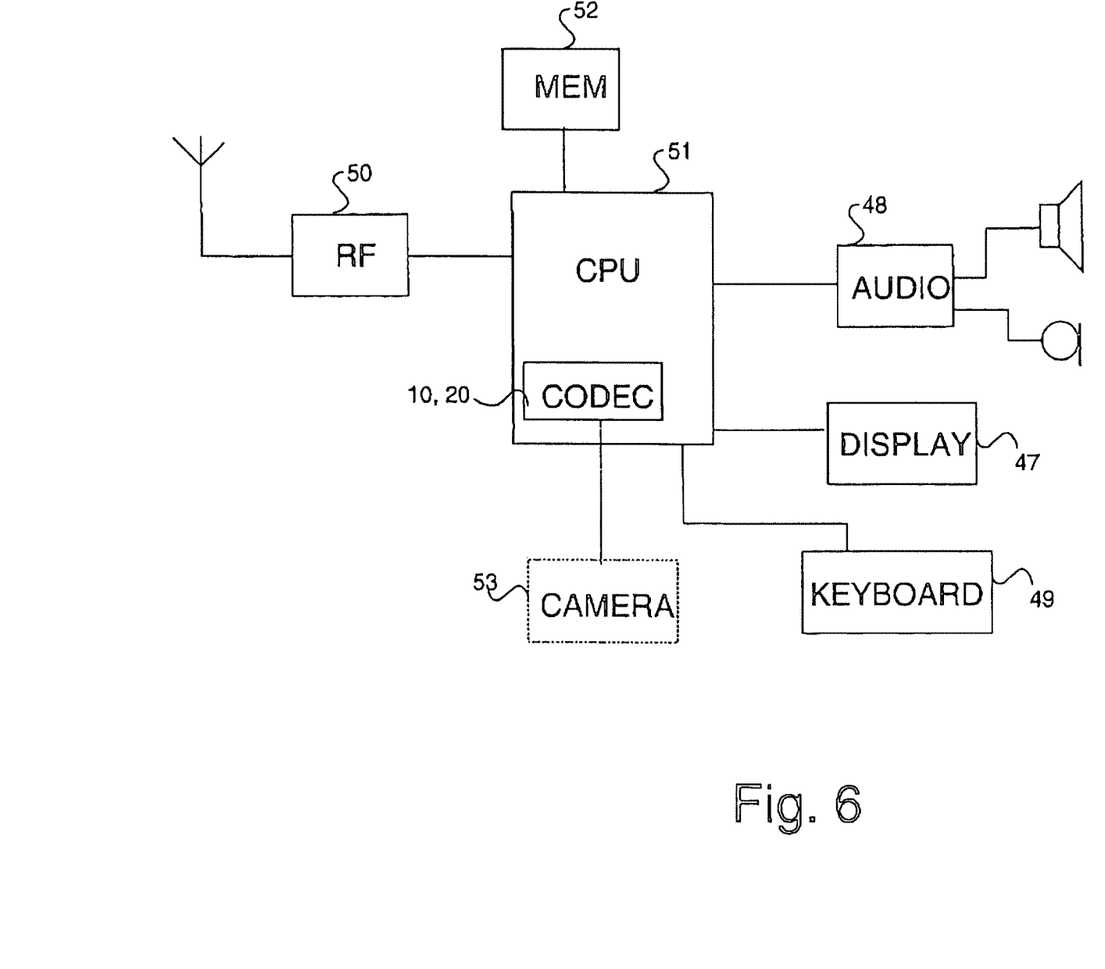
FIG. 6 is a schematic representation of a portable video telecommunications device implementing a method according to the invention.

FIG. 6 shows a mobile terminal 46 intended for use as a portable video telecommunications device and applying the method according to the invention. Advantageously, the mobile terminal 46 comprises at least display means 47 for displaying images, audio means 48 for capturing and reproducing audio information, a keyboard 49 for inputting e.g. user commands, a radio part 50 for communicating with a mobile communications network (not shown), processing means 51 for controlling the operation of the device, memory means 52 for storing information, and preferably a camera 53 for taking images.

The present invention is not solely restricted to the above presented embodiments, but it can be modified within the scope of the appended claims.

What is claimed is:

1. A method, comprising:
    decoding a first encoded image block, which has been encoded using a first type of prediction encoding method, and a second encoded image block, which has been encoded using a second type of prediction encoding method, in accordance with their respective prediction encoding methods to form a first decoded image block and a second decoded image block, the first type of prediction encoding method and the second type of prediction encoding method being selected from a group of prediction encoding methods comprising at least: intra coding, copy coding, motion-compensated prediction coding, and not-coded coding, a block boundary being formed between the first and second decoded image blocks, the first decoded image block being on a first side of the block boundary, the second decoded image block being on a second side of the block boundary;
    providing information on the first and second prediction encoding methods to a block boundary filter; and
    performing, by the block boundary filter, an adaptive block boundary filtering operation on the block boundary formed between the first decoded image block on the first side of the block boundary and the second decoded image block on the second side of the block boundary, the method further comprising:
    determining, by the block boundary filter, a first number of pixels to be examined on the first side of the block boundary and a second number of pixels to be examined on the second side of the block boundary as a parameter of the adaptive block boundary filtering operation, based on the types of the first and the second prediction encoding methods.

2. A method according to claim 1, wherein the adaptive block boundary filtering operation performed on the block boundary by the block boundary filter is dependent at least in part on a region type of an image block on a first side of the block boundary and a region type of an image block on a second side of the block boundary.

3. A method according to claim 1, wherein the number of pixels selected for examination depends on a difference in pixel value between pixels across the block boundary.

4. A method according to claim 1, wherein the number of pixels selected for examination depends on the size of a quantization step used to quantize coefficients used in encoding the image blocks.

5. A method according to claim 1, comprising selecting certain pixels to be filtered and determining a new value for each pixel to be filtered on the basis of pixels that appear in a filtering window set around the pixel.

6. A method according to claim 5, wherein the new value of the pixel is the mean value of the pixels that appear in the filtering window.

7. A method according to claim 1, comprising selecting pixels to be filtered from the pixels selected for examination.

8. A method according to claim 1, wherein the first and second prediction encoding methods are of the same type.

9. A digital signal processor configured to perform a method for reducing visual artefacts due to block boundaries according to claim 1.

10. A block boundary filter configured to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, the block boundary filter being configured to receive information on the types of the first and second prediction encoding methods, and to determine a first number of pixels to be examined on the first side of the block boundary and a second number of pixels to be examined on the second side of the block boundary as a parameter of the adaptive block boundary filtering operation, based on the types of the first and the second prediction encoding methods.

11. A block boundary filter according to claim 10, configured to perform said adaptive block boundary filtering operation on the block boundary in dependence at least in part on a region type of an image block on a first side of the block boundary and a region type of an image block on a second side of the block boundary.

12. A block boundary filter according to claim 10, further configured to select said number of pixels for examination in dependence on the difference in pixel value between pixels across the block boundary.

13. A block boundary filter according to claim 10, wherein the filter is configured to select a number of pixels for examination in dependence on the size of a quantization step used to quantize coefficients used in encoding the image blocks.

14. A block boundary filter according to claim 10, wherein the filter is configured to select certain pixels to be filtered and to determine a new value for each pixel to be filtered on the basis of pixels that appear in a filtering window set around the pixel.

15. A block boundary filter according to claim 14, wherein the filter is configured to calculate the new value for each pixel to be filtered as a mean value of the pixels that appear in the filtering window.

16. A block boundary filter according to claim 10, wherein the first and second prediction encoding methods are of the same type.

17. A video encoder comprising a coding block, a decoding block and a prediction block for prediction encoding a frame of a digital video signal by blocks, the video encoder comprising a block boundary filter for reducing visual artifacts due to a block boundary between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the block boundary filter is configured to receive information on the selected type of the first prediction encoding method and the selected type of the second prediction encoding method and to operate adaptively according to the block types of the frame in the environment of the block boundary to determine a first number of pixels to be examined on the first side of the block boundary and a second number of pixels to be examined on the second side of the block boundary, as a parameter of the filtering operation, based on the selected types of the first and second prediction encoding method.

18. A video decoder comprising a decoding block and a prediction block for decoding a frame of a digital video signal by blocks, the video decoder comprising a block boundary filter for reducing visual artifacts due to a block boundary between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the block boundary filter is configured to receive information on the selected type of the first prediction encoding method and the selected type of the second prediction encoding method, and to operate adaptively according to the block types of the frame in the environment of the block boundary to determine a first number of pixels to be examined on the first side of the block boundary and a second number of pixels to be examined on the second side of the block boundary, as a parameter of the filtering operation, based on the selected types of the first and second prediction encoding method.

19. A video codec comprising a coding block, a decoding block and a prediction block for prediction encoding a frame of a digital video signal by blocks, a block type being defined according to the prediction encoding method for a block selected according to a predetermined set of coding types, the video codec comprising a block boundary filter for reducing visual artifacts due to a block boundary between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the block boundary filter is configured to receive information on the selected type of the first prediction encoding method and the selected type of the second prediction encoding method, and to operate adaptively according to the block types of the frame in the environment of the block boundary to determine a first number of pixels to be examined on the first side of the block boundary and a second number of pixels to be examined on the second side of the block boundary, as a parameter of the filtering operation, based on the selected types of the first and second prediction encoding method.

20. A mobile terminal comprising a video codec, the video codec comprising a coding block, a first decoding block and a first prediction block for prediction encoding a frame of a digital video signal by blocks, and a second decoding block and a second prediction block for decoding a prediction encoded frame of the digital video signal by blocks, a block type being defined according to the prediction encoding method for a block selected according to a predetermined set of coding types, the video codec comprising a block boundary filter for reducing visual artifacts due to a block boundary between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the block boundary filter is configured to receive information on the selected type of the first prediction encoding method and the selected type of the second prediction encoding method, and to operate adaptively according to the block types of the frame in the environment of the block boundary to determine a first number of pixels to be examined on the first side of the block boundary and a second number of pixels to be examined on the second side of the block boundary, as a parameter of the filtering operation, based on the selected types of the first and second prediction encoding method.

21. A storage medium comprising a software program for reducing visual artifacts due to block boundaries between decoded image blocks in a frame of a digital video signal, the software program comprising machine executable code for performing an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the software program comprises machine executable code for receiving information on the selected type of the first prediction encoding method and the selected type of the second prediction encoding method and machine executable code for determining a first number of pixels to be filtered on the first side of the block boundary and a second number of pixels to be examined on the second side of the block boundary, as a parameter of the adaptive block boundary filtering operation, based on the selected types of the first and second prediction encoding method.

22. A storage medium according to claim 21, wherein the first and second prediction encoding methods are of the same type.

23. A method of video encoding comprising:
   performing an adaptive block boundary filtering operation on a block boundary formed between a first decoded image block on a first side of the block boundary and a second decoded image block on a second side of the block boundary using an adaptive block boundary filter, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, the adaptive block boundary filtering operation comprising:
   examining, by the adaptive block boundary filter, the type of the first prediction encoding method and the type of the second prediction encoding method; and
   determining, by the adaptive block boundary filter, a first number of pixels to be examined on the first side of the block boundary and a second number of pixels to be examined on the second side of the block boundary, as a parameter of the filtering operation, based on the types of the first and second prediction encoding methods.

24. A method of video encoding according to claim 23, wherein the first and second prediction encoding methods are of the same type.

25. A method of video decoding, comprising:
   performing an adaptive block boundary filtering operation on a block boundary formed between a first decoded image block on a first side of the block boundary and a second decoded image block on a second side of the block boundary using an adaptive block boundary filter, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, the block boundary filtering operation comprising:
   examining, by the adaptive block boundary filter, the type of the first prediction encoding method and the type of the second prediction encoding method; and
   determining, by the adaptive block boundary filter, a first number of pixels to be examined on the first side of the block boundary and a second number of pixels to be examined on the second side of the block boundary as a parameter of the filtering operation based on the types of the first and second prediction encoding method.

26. A method of video decoding according to claim 25, wherein the first and second prediction encoding methods are of the same type.

27. A video encoder comprising an adaptive block boundary filter configured to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the adaptive block boundary filter is configured to examine the type of the first prediction encoding method and the type of the second prediction encoding method, and to determine a first number of pixels to be examined on the first side of the block boundary and a second number of pixels to be examined on the second side of the block boundary, as a parameter of the adaptive block boundary filtering operation, based on the types of the first and second prediction encoding method.

28. A video encoder according to claim 27, wherein the first and second prediction encoding methods are of the same type.

29. A video decoder comprising an adaptive block boundary filter configured to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the adaptive block boundary filter is configured to examine the type of the first prediction encoding method and the type of the second prediction encoding method, and to determine a first number of pixels to be examined on the first side of the block boundary and a second number of pixels to be examined on the second side of the block boundary, as a parameter of the adaptive block boundary filtering operation, based on the types of the first and second prediction encoding method.

30. A video decoder according to claim 29, wherein the first and second prediction encoding methods are of the same type.

31. A video codec comprising an adaptive block boundary filter configured to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the adaptive block boundary filter is configured to examine the type of the first prediction encoding method and the type of the second prediction encoding method, and to determine a first number of pixels to be examined on the first side of the block boundary and a second number of pixels to be examined on the second side of the block boundary, as a parameter of the adaptive block boundary filtering operation, based on the types of the first and second prediction encoding method.

32. A video codec according to claim 31, wherein the first and second prediction encoding methods are of the same type.

33. A mobile terminal comprising an adaptive block boundary filter configured to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the adaptive block boundary filter is configured to examine the type of the first prediction encoding method and the type of the second prediction encoding method, and to determine a first number of pixels to be examined on the first side of the block boundary and a second number of pixels to be examined on the second side of the block boundary, as a parameter of the adaptive block boundary filtering operation, based on the types of the first and second prediction encoding method.

34. A mobile terminal according to claim 33, wherein the first and second prediction encoding methods are of the same type.

35. A digital signal processor comprising a filtering block configured to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, wherein the filtering block is configured to examine the type of the first prediction encoding method and the second prediction encoding method, and to determine a first number of pixels to be examined on the first side of the block boundary and a second number of pixels to be examined on the second side of the block boundary, as a parameter of the adaptive block boundary filtering operation, based on the types of the first and second prediction encoding method.

36. A method, comprising performing a filtering operation on a block boundary that is dependent at least in part on a first prediction encoding method used to encode first image block on a first side of the block boundary and a second prediction encoding method used to encode a second image block on a second side of the block boundary, wherein the first and the second prediction encoding methods are selected from a group of prediction encoding methods comprising at least: intra coding, copy coding, motion-compensated prediction coding, and not-coded coding.

37. A apparatus comprising a filter configured to examine a prediction encoding method used to encode a first image block on a first side of a block boundary and a prediction encoding method used to encode a second image block on a second side of the block boundary and to perform a filtering operation on the block boundary in dependence at least in part on the first prediction encoding method used to encode the first image block on the first side of the block boundary and the second prediction encoding method used to encode the second image block on the second side of the block boundary, wherein the first and the second prediction encoding methods are selected from a group of prediction encoding methods comprising at least: intra coding, copy coding, motion-compensated prediction coding, and not-coded coding.

38. A video encoder comprising a filter according to claim 37.

39. A video decoder comprising a filter according to claim 37.

40. A mobile terminal comprising a filter according to claim 37.

41. A method comprising:
using an adaptive block boundary filter to perform an adaptive block boundary filtering operation on a block boundary formed between a first decoded image block on a first side of the block boundary and a second decoded image block on a second side of the block boundary, the first decoded image block having been encoded using a first type of prediction encoding method and the second decoded image block having been encoded using a second type of prediction encoding method, the first type of prediction encoding method and the second type of prediction encoding method being selected from a group of prediction encoding methods comprising at least: intra coding, copy coding, motion-compensated prediction coding, and not-coded coding, the method further comprising:
receiving, by the adaptive block boundary filter, information on the type of the first prediction encoding method and the type of the second prediction encoding method, and
determining, by the adaptive block boundary filter, a first number of pixels to be examined on the first side of the block boundary and a second number of pixels to be examined on the second side of the block boundary, as a parameter of the filtering operation, based at least in part upon the types of the first and second prediction encoding methods.

* * * * *

UNITED STATES PATENT AND TRADEMARK OFFICE
CERTIFICATE OF CORRECTION

| | | |
|---|---|---|
| PATENT NO. | : 9,800,891 B2 | Page 1 of 1 |
| APPLICATION NO. | : 09/766035 | |
| DATED | : October 24, 2017 | |
| INVENTOR(S) | : Kalevo et al. | |

It is certified that error appears in the above-identified patent and that said Letters Patent is hereby corrected as shown below:

On the Title Page

Item [57] Column 2,
Line 5, "method" should read --method,--.
Line 6, "boundary" should read --boundary.--.

In the Claims

Column 12,
Line 27, Claim 9 "artefacts" should read --artifacts--.

Column 18,
Line 6, Claim 36 "encode" should read --encode a--.
Line 14, Claim 37 "A apparatus" should read --An apparatus--.

Signed and Sealed this
Third Day of July, 2018

Andrei Iancu
*Director of the United States Patent and Trademark Office*